(12) United States Patent
Kuriyama (10) Patent No.: US 9,124,099 B2
(45) Date of Patent: Sep. 1, 2015

(54) STORAGE BATTERY SYSTEM

(75) Inventor: Hiroshi Kuriyama, Tokyo (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 684 days.

(21) Appl. No.: 13/473,270

(22) Filed: May 16, 2012

(65) Prior Publication Data

US 2012/0306271 A1 Dec. 6, 2012

(30) Foreign Application Priority Data

Jun. 3, 2011 (JP) ................................ 2011-125446

(51) Int. Cl.
- H02J 7/00 (2006.01)
- H02J 9/00 (2006.01)
- H02J 3/32 (2006.01)
- H02J 9/06 (2006.01)

(52) U.S. Cl.
CPC ... *H02J 9/00* (2013.01); *H02J 3/32* (2013.01); *H02J 7/00* (2013.01); *H02J 9/06* (2013.01); *Y10T 307/344* (2015.04); *Y10T 307/615* (2015.04); *Y10T 307/625* (2015.04)

(58) Field of Classification Search
CPC ................. H02J 9/06; H02J 7/00; H02J 9/00; H02J 9/04; Y10T 307/615; Y10T 307/625
USPC ................................................... 307/64, 66
See application file for complete search history.

(56) References Cited

U.S. PATENT DOCUMENTS

2005/0099750 A1* 5/2005 Takahashi et al. ............... 361/92
2011/0140667 A1* 6/2011 Moon ........................... 320/134

FOREIGN PATENT DOCUMENTS

| JP | 06-022473 | A | 1/1994 |
| JP | 07-295688 | A | 11/1995 |
| JP | 2000-316239 | A | 11/2000 |
| JP | 2003-348768 | | 12/2003 |
| JP | 2007-014066 | A | 1/2007 |
| JP | 2010-016989 | | 1/2010 |
| JP | 2010-512727 | A | 4/2010 |

OTHER PUBLICATIONS

Japanese Office Action issued in corresponding Japanese Application No. 2011-125446, dated Oct. 21, 2014, with English translation.

* cited by examiner

*Primary Examiner* — Carlos Amaya
(74) *Attorney, Agent, or Firm* — McDermott Will & Emery LLP (57) ABSTRACT

A storage battery is charged with power supplied from at least one of a commercial power system and an independent power source, and supplies the charged power to a plurality of electric devices or the commercial power system. A control unit switches the operation state of the storage battery to either charging or discharging, and switches connection destinations of the storage battery. When the commercial power system is not in a power outage state, the control unit supplies power from the storage battery to the electric devices or the commercial power system only if the remaining level of the storage battery exceeds a reference value.

5 Claims, 6 Drawing Sheets

STORAGE BATTERY SYSTEM

CROSS-REFERENCE TO RELATED APPLICATION

The disclosure of Japanese Patent Application No. 2011-125446 filed on Jun. 3, 2011 including the specification, drawings and abstract is incorporated herein by reference in its entirety.

BACKGROUND

The invention relates to a storage battery system which can be used as a UPS.

Today, Uninterruptible Power Supplies (UPS) are being widely used in general offices to supply electric power to information devices such as servers until the information device normally terminates when power breaks down. Furthermore, it is under consideration to restrain use of commercial electric power by providing, in conjunction with a UPS, an independent power source using renewable energy such as solar-generated power or wind-generated power.

Japanese Patent Laid-Open No. 2003-348768 (Patent Document 1) discloses a UPS provided in conjunction with an independent power source. In the UPS described in the document, output from an independent power source and output of a secondary battery are converted into alternating current and output to an output terminal while a commercial AC power source breaks down. If the output power from the independent power source has surplus, regardless of either receiving commercial AC power or experiencing power outage, the surplus power is regenerated for the commercial AC power source.

Japanese Patent Laid-Open No. 2010-16989 (Patent Document 2) describes a power generating system which determines or predicts which of power selling or self-consumption is more advantageous when an independent power source is in conjunction with a commercial power system. Specifically, commercial power is supplied from the commercial power system to a domestic power line via a power meter for power selling/power purchase. Electric power generated by a renewable energy generation device is also supplied to the domestic power line. The power supplied to the power line is supplied to a domestic load and an information processing unit via a power distribution board. The information processing unit determines and predicts which of power selling and self-consumption is more advantageous.

Published Japanese Translation of PCT International Publication for Patent Applications No. 2010-512727 (Patent Document 3) discloses a power aggregation system for distributed electric resources (a smart grid). In one embodiment of the document, a service establishes individual Internet connections for a number of power resources such as electric vehicles which are intermittently connected to a power grid. The service then optimizes the power flow to meet the needs of each resource and each resource owner by aggregating the flow across a number of resources so that they are suited for the needs of the power grid.

SUMMARY

If a storage battery for a UPS has a large capacity, the UPS will be available as a storage battery system for efficiently using electric power by providing and receiving power to and from a commercial power system. Surplus power can be stored during the nighttime and used for self-consumption at the afternoon peak time of power usage or for power selling. However, no UPS-supporting storage battery system has been in practical use. It is not clear how to combine the function of a UPS with that of a large capacity storage battery to achieve a high efficiency.

An object of the invention is to provide an efficient storage battery system available as a UPS.

A storage battery system according to an embodiment of the invention includes a storage battery, a remaining level detection device, a power outage detection device, and a control unit. The storage battery is charged with power supplied from at least one of a commercial power system and an independent power source, and supplies the charged power to a plurality of electric devices or the commercial power system. The remaining level detection device detects the remaining level of the storage battery. The power outage detection device detects whether or not the commercial power source is in a power outage state. The control unit switches, based on the detection result by the remaining level detection device and the power outage detection device, the operation state of the storage battery to either charging or discharging, and switches connection destinations of the storage battery. When the commercial power system is not in a power outage state, the control unit supplies power from the storage battery to the electric devices or the commercial power system only if the remaining level of the storage battery exceeds a reference value. The reference value is determined based on the power required to be supplied to the electric devices while the commercial power system breaks down.

According to the above embodiment, power necessary during power outage is charged and power which has been charged more than power necessary during power outage is supplied to electric devices or a commercial power system. Consequently, the power charged in the storage battery can be efficiently used.

DETAILED DESCRIPTION

An embodiment of the invention will be described in detail below, with reference to the drawings. In all the drawings for explaining embodiments, the same symbol is attached to the same member, as a principle, and the repeated explanation is omitted.

<Embodiment 1> [Outline of UPS-supporting Storage Battery System]

A system with a function as a UPS added to a large-capacity storage battery will be referred to as a UPS-supporting storage battery system. This system can be used at home and in an office. Characteristics of the UPS-supporting storage battery system are shown below.

(i) An electricity rate can be saved by charging power during the nighttime when the rate is low and using the charged power during the daytime when the rate is high.

(ii) Selling surplus power charged in the storage battery to a power plant allows to obtain revenue.

(iii) During power outage, power can be supplied from the storage battery to keep home electric appliances driving. Furthermore, instructions can be issued during power outage so that information devices, such as servers, terminate normally. The function of (iii) is referred to as a UPS function.

Widespread use of UPS-supporting storage battery systems in urban areas can smooth power consumption during the daytime and the nighttime and restrain the maximum power generation in power plants. This leads to energy saving in the society.

In the UPS-supporting storage battery system according to the embodiment 1, a portion of the electric energy charged to the storage battery is stored. This portion is equivalent to the capacity corresponding to the minimum power required to realize the UPS function (hereafter, referred to as electric capacity for UPS). The surplus electric energy excluding the electric capacity for UPS is used for power supply or power selling. It is desired to precisely estimate the electric capacity for UPS and minimize the electric capacity for UPS. The UPS-supporting storage battery system has the following functions.

(i) Power supply can be turned ON or OFF for each power supply path. Accordingly, the electric capacity for UPS is minimized.

(ii) The electric capacity for UPS is precisely estimated by collecting information required for the UPS function from the information device.

(iii) The electric capacity for UPS is precisely estimated by measuring power consumption for each power supply path.

(iv) Information required for the UPS function is collected by providing a PLC (Power Line Communications) modem and performing PLC communication with the information device via a power line. These functions are described specifically below.

[Specific Configuration of UPS-supporting Storage Battery System]

Figure 1:
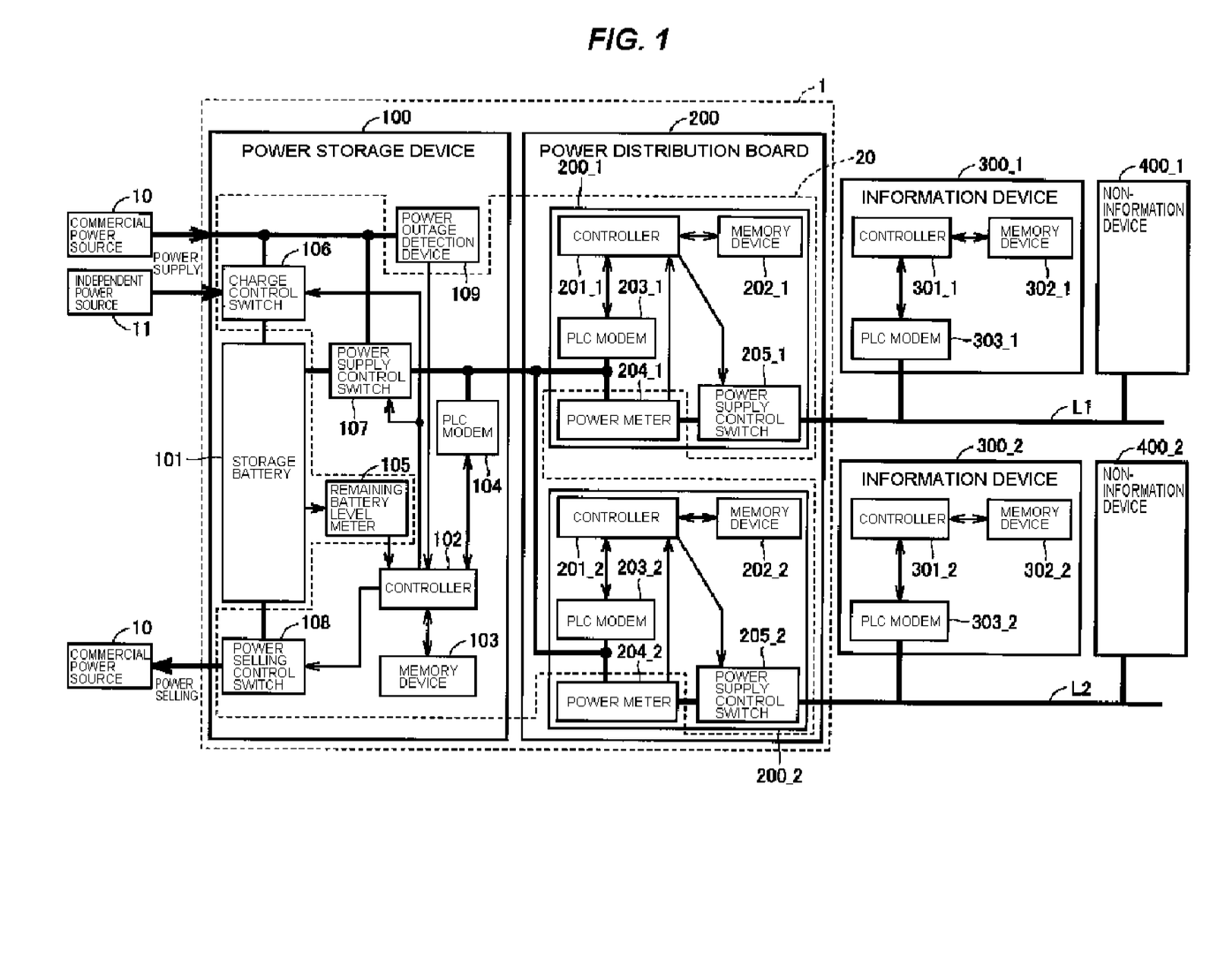
FIG. 1 is a block diagram illustrating a configuration of a UPS-supporting storage battery system 1 according to an embodiment 1 of the invention.

FIG. 1 is a block diagram illustrating a configuration of a UPS-supporting storage battery system 1 according to an embodiment 1 of the invention. With reference to FIG. 1, the UPS-supporting storage battery system 1, installed at home or in an office, includes a power storage device 100 and a power distribution board 200.

FIG. 1 illustrates a case where two power supply paths L1 and L2 (denoted as power supply paths L when referred to collectively) are drawn out from the power distribution board 200. The power supply path L1 connects to an information device 300_1 and a non-information device 400_1, and the power supply path L2 connects to an information device 300_2 and a non-information device 400_2. The number of power supply paths L may be more than two, and each of the power supply paths L may connect to a larger number of information devices 300 and non-information devices 400.

The information devices 300 (300_1 and 300_2) are devices, such as servers or personal computers, which have a communication function and require power supply from the UPS during power outage. The non-information devices 400 (400_1 and 400_2) refer to devices other than the information devices 300. In the following, information devices and non-information devices are also collectively referred to as electric devices. Although an information device 300 is shown in FIG. 1 as a representative of devices requiring power supply from the UPS during power outage (also referred to as a specific device), these devices are not limited to the information device 300. Emergency illumination or safety facilities may be devices other than the information devices.

(Configuration of Power Storage Device 100)

The power storage device 100 includes a storage battery 101, a controller 102, a memory device 103, a PLC modem 104, a remaining battery level meter 105, a charge control switch 106, a power supply control switch 107, a power selling control switch 108, and a power outage detection device 109.

The storage battery 101, which is a large-capacity storage battery, is charged with power supplied from a commercial power system (commercial power source) 10, or an independent power source 11 such as solar panel, and uses the charged power for supplying power to electric devices or for power selling to the commercial power system 10.

The controller 102, which is a controller for controlling the power storage device 100, controls charging of, power supply from, and power selling via the storage battery 101. The controller 102 further uses the PLC modem 104 to communicate with the power distribution board 200 and the information devices 300.

The memory device 103 is a device which reads or writes information required for the controller 102 to perform control. The memory device 103 stores electricity rate/power selling price for each time zone, and information collected from the power distribution board 200 and the information device 300.

The PLC modem 104 is used by the controller 102 to perform PLC communication with the power distribution board 200 and the information device 300.

The remaining battery level meter 105 measures or estimates the remaining level (currently charged amount) of the storage battery 101.

The charge control switch 106 determines whether or not to charge the storage battery 101 with the power supplied from the commercial power system 10 or the independent power source 11, according to an instruction of the controller 102. When the storage battery 101 is charged with the power, the alternating current from the commercial power system 10 is converted into direct current. When the output of the independent power source 11, such as a wind-power generation device, is alternating current, the power is converted into direct current and then the storage battery 101 is charged with the power.

The power supply control switch 107 determines which of the power received from the commercial power system 10 or the output power of the storage battery 101 is supplied to the electric devices (information devices 300 or non-information devices 400) via the power distribution board 200. The power supply control switch 107 switches the connection according to an instruction of the controller 102. When power is supplied to the electric devices 300 and 400, the direct current output of the storage battery 101 is converted into alternating current.

The power selling control switch 108 determines whether or not to perform power selling which supplies power from the storage battery 101 to the commercial power system 10, according to an instruction of the controller 102. When reverse power flow to the commercial power system 10 occurs, the output of the storage battery 101 is converted into alternating current.

(Configuration of Power Distribution Board 200)

The power distribution board 200 includes a controller 201, a memory device 202, a PLC modem 203, a power meter 204, and a power supply control switch 205, which are provided for each power supply path L. In FIG. 1, suffixes "_1" and "_2" are provided at the end of the reference numerals to distinguish between the corresponding power supply paths L1 and L2, respectively. In the power distribution board 200, parts corresponding to the power supply path L1 are referred to as a power distribution unit 200_1 and ones corresponding to the power supply path L2 are referred to as a power distribution unit 200_2.

The controller 201, which controls the power distribution board 200, determines whether or not to supply power to the power supply paths L1 and L2. The controller 201 further uses the PLC modem 203 to communicate with the power storage device 100 and the information device 300.

The memory device 202 reads or writes information required for the controller 201 to perform control. The memory device 202 stores information relating to the UPS function collected from the information device 300.

The PLC modem 203 is used by the controller 201 to perform PLC communication with the power storage device 100 and the information device 300.

The power meter 204 measures power consumption of all the electric devices 300 and 400 connected to the corresponding power supply path L.

The power supply control switch 205 determines whether or not to supply power to the corresponding power supply path L, according to an instruction of the controller 201.

(Configuration of Information Device 300)

The information device 300, which requires power supply from the UPS during power outage, communicates with the power distribution board 200 and the power storage device 100. The information device 300 includes a controller 301, a memory device 302, and a PLC modem 303. To distinguish between the power supply paths L1 and L2 to which the information device 300 is connected, suffix "_1" or "_2" is provided at the end of the reference numerals.

The controller 301 controls the information device 300. The controller 301 further uses the PLC modem 303 to perform PLC communication with the power storage device 100 and the power distribution board 200.

The memory device 302 reads or writes information required for the controller 301 to perform control.

The PLC modem 303 is used by the controller 301 to perform PLC communication with the power storage device 100 and the power distribution board 200.

(Configuration of Non-Information Device 400)

The non-information device 400, which needs no power supply from the UPS during power outage, has no communication function in the embodiment. To distinguish between the power supply paths L1 and L2 to which the non-information device 400 is connected, suffix "_1" or "_2" is provided at the end of the reference numerals.

In the UPS-supporting storage battery system 1, the controllers 102 and 201, the memory devices 103 and 202, the PLC modems 104 and 203, and the control switches 106, 107, 108, and 205 correspond to a control unit 20 of the invention. The control unit 20 switches the operation state of the storage battery 101 between charging and discharging, based on the detection result of the remaining battery level meter 105 and the power outage detection device 109, and also switches the device to which the storage battery 101 is connected (source or destination of power supply).

[Operation of UPS-Supporting Storage Battery System]

Next, the operation of the UPS-supporting storage battery system 1 of FIG. 1 is described.

(Power Charging/Power Supply/Power Selling)

The power storage device 100 can use the storage battery 101 for charging, supplying power to a load, and power selling when the commercial power system 10 is not in a power outage state.

When the storage battery 101 is charged with the power from the commercial power system, the controller 102 switches the connection destination of the charge control switch 106 to the commercial power system 10. The storage battery 101 and the commercial power system 10 are connected via the charge control switch 106.

When the storage battery 101 is charged with the output of the independent power source 11, the controller 102 switches the connection destination of the charge control switch 106 to the independent power source 11. The storage battery 101 and the independent power source 11 are connected via the charge control switch 106.

When power is supplied from the commercial power system 10 to the electric devices 300 and 400 which are power loads, the controller 102 switches the connection destination of the power supply control switch 107 from the storage battery 101 to the commercial power system 10. Accordingly, the power supplied from the commercial power system 10 is supplied to the power supply paths L1 and L2 via the power distribution board 200.

When the output of the storage battery 101 is used to supply power to the electric devices 300 and 400 which are loads, the controller 102 switches the connection destination of the power supply control switch 107 from the commercial power system 10 to the storage battery 101. Accordingly, the power output from the storage battery 101 is supplied to the power supply paths L1 and L2 via the power distribution board 200.

When the output of the storage battery 101 is supplied to the commercial power system 10 (the case of power selling), the controller 102 turns on the power selling control switch 108. As a result, the output power of the storage battery 101 is sold to an electric power company.

The controller 102 determines which of charging, power supply, and power selling will be performed when the commercial power system 10 is not in a power outage state, according to the power purchase price, power selling price, and remaining level of the storage battery 101. As a basis of the determination, in the memory device 103, the power purchase price of commercial power for each time zone and the power selling price to the electric power company are preliminarily stored.

Figure 2:
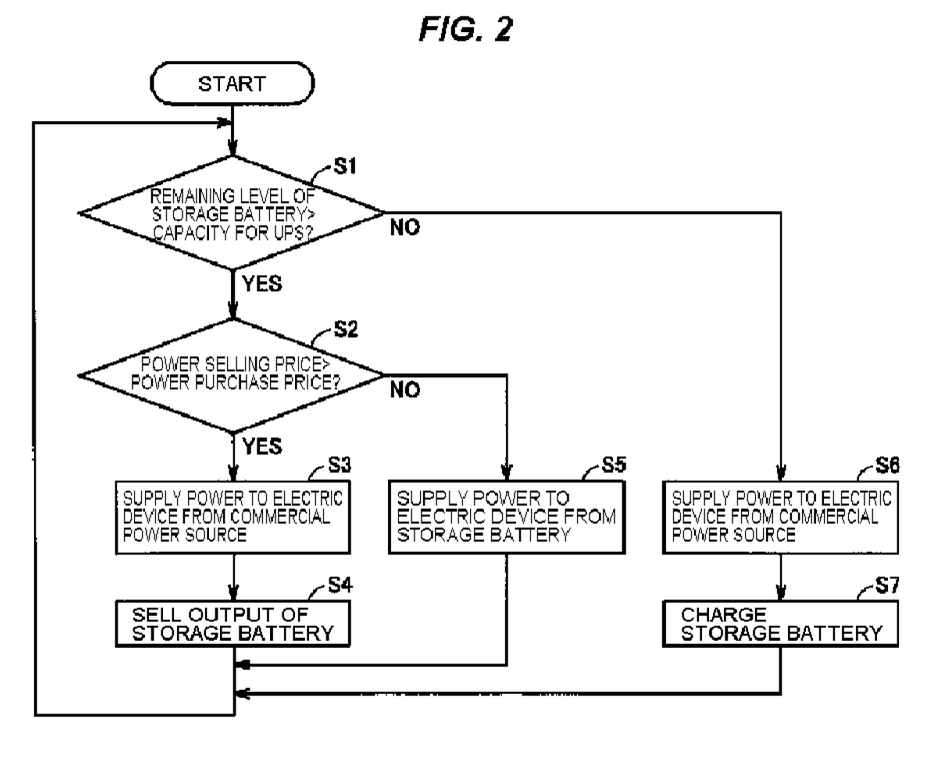
FIG. 2 is a flow chart illustrating a process of determining which of charging, power supply, or power selling will be performed while a commercial power system does not break down.

FIG. 2 is a flow chart illustrating a process of determining which of charging, power supply, or power selling is performed when a commercial power system is not in a power outage state.

With reference to FIGS. 1 and 2, the controller 102 first determines whether or not the remaining level of the storage battery 101 is larger than the electric capacity for UPS (step S1). Here, the electric capacity for UPS corresponds to the amount of power required to be supplied to the electric devices which is a load when the commercial power system 10 breaks down. The calculation method of the electric capacity for UPS is described below.

If the remaining level of the storage battery 101 is less than the electric capacity for UPS (NO in step S1), the controller 102 switches the power supply control switch 107 so that power is supplied from the commercial power system to the electric devices 300 and 400 (step S6). Furthermore, the controller 102 switches the connection of the charge control switch 106 so that the storage battery 101 is charged with power supplied from at least one of the commercial power system 10 and the independent power source 11. Accordingly, the storage battery 101 is charged to its maximum capacity (step S7). Subsequently, the process returns to step S1.

If the remaining level of the storage battery 101 exceeds the electric capacity for UPS (YES in step S1), the controller 102 determines whether or not the current power selling price exceeds the power purchase price (rate of commercial power), based on data preliminarily stored in the memory device 103 (step S2).

If the power selling price exceeds the power purchase price (YES in step S2), the controller 102 switches the power supply control switch 107 so that power is supplied from the commercial power system 10 to the electric devices 300 and 400 (step S3). Furthermore, the controller 102 turns on the power selling control switch 108 to sell electric power to the electric power company by causing reverse flow of the output of the storage battery 101 to the commercial power system 10 (step S4).

If the power selling price does not exceed the power purchase price (No in step S2), the controller 102 switches the power supply control switch 107 so that power is supplied from the storage battery 101 to the electric devices 300 and 400 (step S5).

After step S4 or S5 is performed, the process returns to step S1. As long as the remaining amount of the storage battery exceeds the electric capacity for UPS, (YES in step S1), steps S2 to S5 are repeated. As a result, the power supplied from the commercial power system 10 can be used more economically.

The UPS-supporting storage battery system 1 in the embodiment 1 thus allows power supply from the storage battery 101 to the electric devices 300 and 400, and power supply (power selling) from the storage battery 101 to the commercial power system 10 as long as the remaining amount of the storage battery exceeds the electric capacity for UPS when the commercial power system 10 is not in a power outage state.

(PLC Communication)

The power storage device 100, the power distribution board 200, and the information device 300 communicate according to PLC. The controller 102 of the power storage device 100 controls the PLC modem 104, and transmits and receives PLC signals to and from the power distribution board 200 and the information device 300. The controller 201 of the power distribution board 200 controls the PLC modem 203, and transmits and receives PLC signals to and from the power storage device 100 and the information device 300. The controller 301 of the information device 300 controls the PLC modem 303, and transmits and receives PLC signals to and from the power storage device 100 and the power distribution board 200.

(UPS Function)

Figure 3:
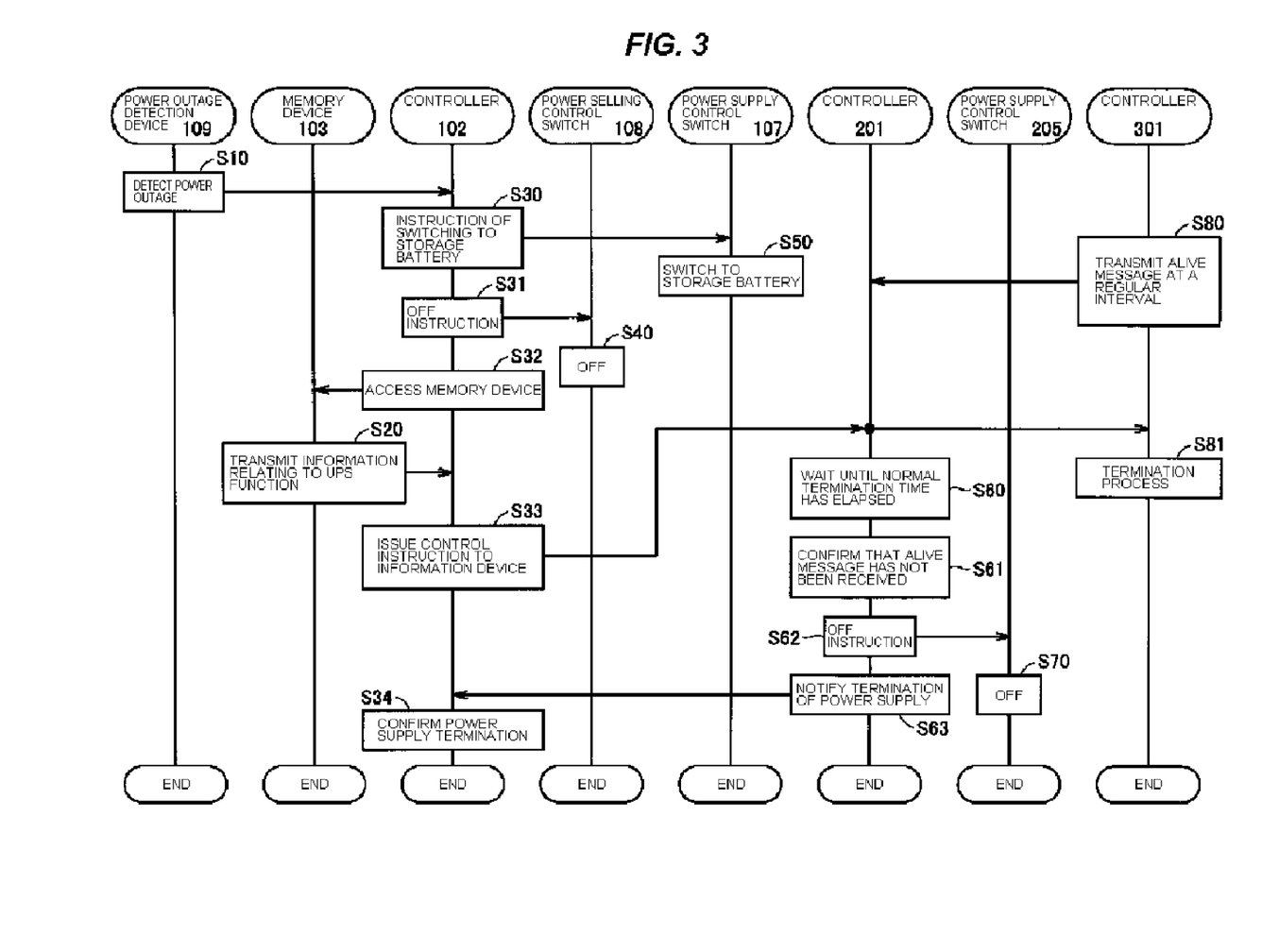
FIG. 3 is a flow chart illustrating a process performed by the storage battery system 1 while the commercial power system breaks down.

FIG. 3 is a flow chart illustrating a process performed by the storage battery system 1 while the commercial power system breaks down. With reference to FIGS. 1 and 3, an operation of the UPS-supporting storage battery system 1 during power outage is described below.

(i) Detecting power outage and maintaining power supply to load

When the commercial power system 10 breaks down, the power outage detection device 109 of the power storage device 100 first detects the power outage, and transmits information of occurrence of power outage to the controller 102 (step S10).

Upon receiving the information of power outage, the controller 102 instructs the storage battery 101 to switch the connection destination from the commercial power system 10 to the power supply control switch 107 (step S30). The connection destination of the power supply control switch 107 which has received the switching instruction is switched to the storage battery 101 (step S50). As a result, power supply to the electric devices 300 and 400 is maintained by the output of the storage battery 101.

The controller 102 further issues an OFF instruction to the power selling control switch 108 (step S31). The power selling control switch 108 which has received the OFF instruction turns off so that power selling from the storage battery 101 to the commercial power system 10 is terminated.

(ii) Normal termination process for information device 300

Furthermore, during power outage, the controller 102 accesses the memory device 103 (step S32), and receives information relating to the UPS function transmitted from the memory device 103. The UPS function is described below (step S20). The controller 102 issues a control instruction to each of the information devices 300 based on the information relating to the UPS function (step S33). Although the control instruction basically prompts the information device 300 to normally terminate, its specific content differs according to the information devices 300. The information is exchanged between the power storage device 100 and the information device 300 via the controller 201 of the power distribution board 200.

The memory device 103 in the power storage device 100 and the memory device 202 in the power distribution board 200 preliminarily stores the information relating to the UPS function. The UPS function information includes information of time required until each information device 300 is normally terminated (operation time during the power outage).

(iii) Confirming normal termination of information device

The controller 301 of each information device 300 transmits an alive message to the corresponding controller 201 of the power distribution board 200 at a predetermined regular interval during its operation (step S80). Upon receiving the control instruction issued by the controller 102 via the corresponding controller 201, the controller 301 of each information device 300 starts the termination process (step S81).

After the time required for the corresponding information device 300 to normally terminate has elapsed (step S60), each controller 201 of the power distribution board 200 confirms whether or not to receive the alive message from the corresponding information device 300 (step S61).

(iv) Reduction of electric capacity for UPS by terminating power supply to power supply path After having confirmed that all the information devices 300 connected to the corresponding power supply path L have been normally terminated (step S61), each controller 201 of the power distribution board 200 issues an OFF instruction to the corresponding power supply control switch 205 (step S62). The power supply control switch 205 which has received the OFF instruction turns off (step S70) so that power supply to the corresponding power supply path L is terminated.

Terminating power supply sequentially, starting from the power supply path along which normal termination of all the information devices 300 has been confirmed, also results in zero power consumption by the non-information devices 400 connected to power supply paths to which power supply has been terminated. Then, the electric capacity for UPS can be reduced.

After having issued the OFF instruction to the corresponding power supply control switch 205 (step S62), each controller of the power distribution board 200 notifies the information to the controller 102 of the power storage device 100 (step S63). As a result, termination of power supply is confirmed by the controller 102 of the power storage device 100 (step S34).

(Estimation of Electric Capacity for UPS)

The following is description of a procedure by the controller 102 of acquiring the information relating to the UPS function and the measurement result of the power consumption, and a method of calculating the electric capacity for UPS based on the information.

(v) Collecting information relating to UPS Function

Figure 4:
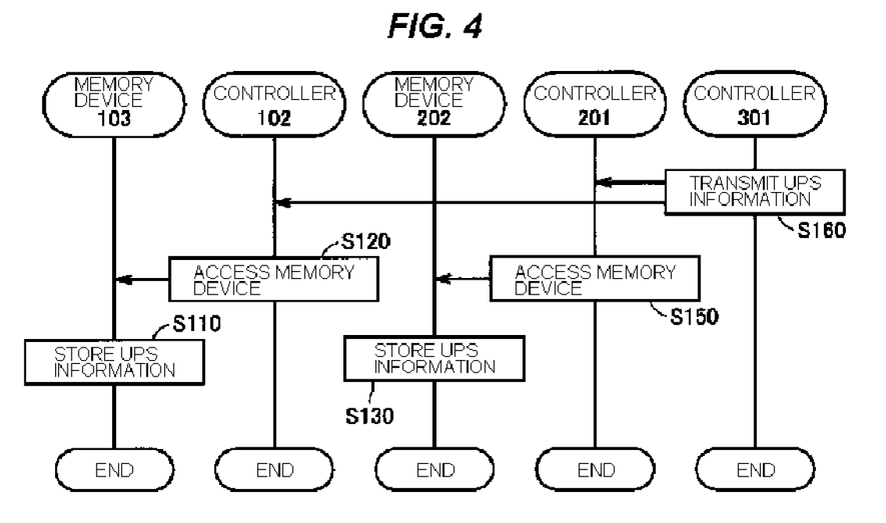
FIG. 4 is a flow chart illustrating a procedure of collecting information relating to a UPS function.

FIG. 4 is a flow chart illustrating a procedure of collecting the information relating to the UPS function.

With reference to FIGS. 1 and 4, when connected to the power supply path L, the controller 301 of each information device 300 transmits the information relating to the UPS function to the controller 102 of the power storage device 100 and the controller 201 of the power distribution board 200 (step S160). The UPS function information includes its own identification information, control instruction to be performed during power outage, time required for normal termination (operation time during the power outage), and power consumption. The UPS function information is preliminarily stored in the memory device 302.

The controller 102 of the power storage device 100 which has received the UPS function information accesses the corresponding memory device 103 (step S120), and stores the UPS function information in the memory device 103 (step S110). Similarly, upon receiving the UPS function information, the controller 201 in each power distribution board 200 accesses the corresponding memory device 202 (step S150), and stores the UPS function information in the memory device 202 (step S130).

(vi) Measurement of power consumption for each power supply path

Figure 5:
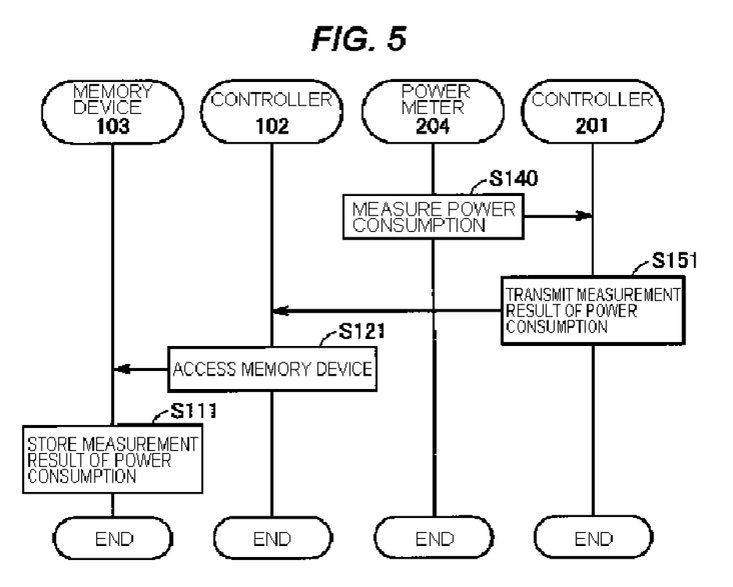
FIG. 5 is a flow chart illustrating a procedure of measuring power consumption along each power supply path and transmitting the measurement result to a controller 102.

FIG. 5 is a flow chart illustrating a procedure of measuring power consumption for each power supply path and transmitting the measurement result to a controller 102.

With reference to FIGS. 1 and 5, each controller 201 of the power distribution board 200 uses the power meter 204 at a regular time interval to measure power consumption of all the electric devices 300 and 400 connected to the corresponding power supply path L (step S140). Each controller 201 transmits the measurement result of power consumption to the controller 102 of the power storage device 100 (step S151). The controller 102 of the power storage device 100 accesses the memory device (step S121), and stores the measurement result of the acquired power consumption in the memory device 103 (step S111).

(vii) Estimation of electric capacity for UPS

The controller 102 of the power storage device 100 calculates the electric capacity for UPS from the information relating to the UPS function and the power consumption for each power supply path L, according to the following formulas (1) and (2).

M power supply paths L1, L2, . . . , and Lm are drawn from the power distribution board 200. Then, the first power supply path L1 connects to n information devices 300_1 to 300_$n$. T1, T2, . . . , and Tn are the times required to normally terminate the n information devices 300_1 to 300_$n$. Tmax is the maximum of T1, T2, . . . , and Tn. W1, W2, . . . , and Wn are the power consumption of the n information devices 300_1 to 300_$n$. P is the power consumption of all the electric devices 300 and 400 connected to the power supply path L1. Accordingly, the amount of power WH1 required to be supplied to the first power supply path L1 to normally terminate the information device 300 during power outage is calculated by formulas (1) (WH1=W1×T1+W2×T2+ . . . +Wn×Tn+Q×Tmax) and (2) (Q=P−(W1+W2+ . . . +Wn)).

With regard to the formulas (1) and (2), when all the information devices 300 connected to the power supply path L1 are normally terminated, the corresponding power supply control switch 205 turns off. As a result, power supply to the non-information devices 400 is terminated. Accordingly, the amount of power supply to the non-information devices 400 is expressed by Q×Tmax in the formula (1). Tmax corresponds to the time for which power supply to the power supply path L is maintained during the power outage.

In a manner similar to the above one, the amount of power WH2 to WHm required to be supplied to the second to the m-th supply paths L2 to Lm to normally terminate the information devices 300 during power outage can be calculated. The electric capacity for UPS finally calculated is equivalent to the amount of power expressed by formula (3) (WH1+WH2+ . . . +WNm).

The controller 102 of the power storage device 100 acquires information relating to the UPS function of respective information devices 300 and the measurement result of the total power consumption for each power supply path L, and acquires the electric capacity for UPS based on the information. As a result, a portion of the total capacity of the storage battery other than the electric capacity for UPS can be efficiently used for power supply and power selling.

Furthermore, because power supply is terminated sequentially, starting from the power supply path L along which all the specific devices have been normally terminated, the electric capacity for UPS can be reduced. Then, the capacity available for power selling and power supply can be increased.

SPECIFIC EXAMPLE

Figure 6:
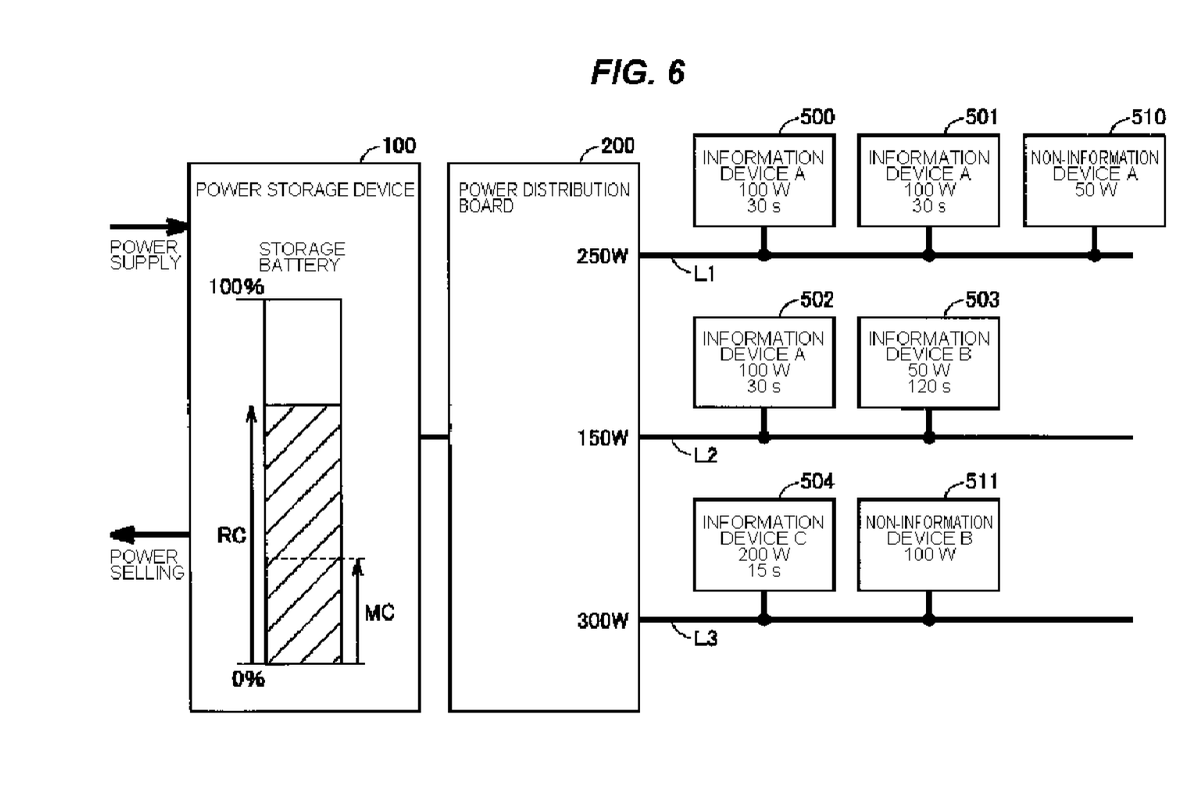
FIG. 6 illustrates a specific application of a UPS-supporting storage battery system according to the embodiment 1.

FIG. 6 illustrates a specific application of a UPS-supporting storage battery system according to the embodiment 1. A portion of the remaining level RC of the storage battery that exceeds the capacity MC for UPS is used for power selling and power supply.

With reference to FIG. 6, power supply lines L1, L2, and L3 are drawn from the power distribution board 200. The power supply line L1 connects to information devices 500 and 501 and a non-information device 510. The power supply line L2 connects to information devices 502 and 503. The power supply path L3 connects to an information device 504 and a non-information device 511. Power consumption of the information devices A (500, 501, and 502) is 100 W each, and the time required to normally terminate the information devices A (500, 501, and 502) is 30 seconds. Power consumption of the information device B (503) is 50 W, and the time required to normally terminate the information device B (503) is 120 seconds. Power consumption of the information device C (504) is 200 W, and the time required to normally terminate the information device C (504) is 15 seconds. Power consumption of the non-information device A (510) is 50 W, and that of the non-information device B (511) is 100 W.

Power WH1 supplied to the power supply path L1 until power supply to the power supply path L1 is terminated after occurrence of power outage becomes 7500 (J) (formula: WH1=100*30+100*30+50*30). Power WH2 supplied to the power supply path L2 until power supply to the power supply path L2 is terminated after occurrence of power outage becomes 9000 (J) (formula: WH2=100*30+50*120). Power WH3 supplied to the power supply path L3 until power supply to the power supply path L3 is terminated after occurrence of power outage becomes 4500 (J) (formula: WH3=200*15+100*15). Therefore, the electric capacity for UPS is 21000 (J) (formula: WH1+WH2+WH3=7500+9000+4500).

If supply to the power supply paths L1 to L3 is terminated after all the information devices 500 to 504 have been normally terminated, power WHc supplied until power supply is terminated becomes 36000 (J) (WHc=100*30+100*30+ 50*120+100*30+50*120+200*15+100*120). The electric capacity for UPS value takes a value corresponding to the power WHc, which is larger than the previous calculation result. According to the embodiment 1, the electric capacity for UPS can be reduced by terminating power supply sequentially, starting from the power supply path L along which all the specific devices are connected to have been normally terminated.

<Embodiment 2>

Figure 7:
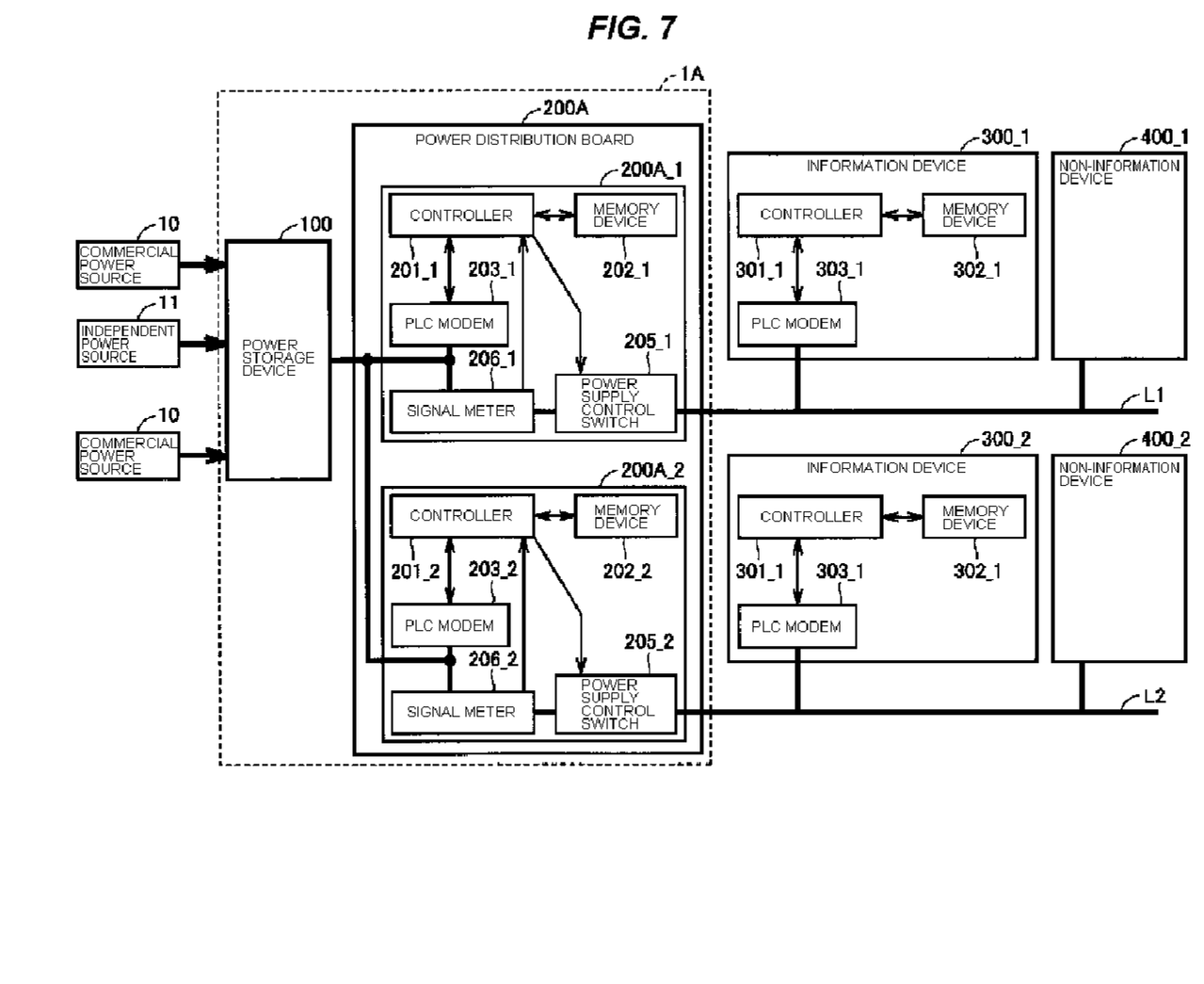
FIG. 7 is a block diagram illustrating a configuration of a UPS-supporting storage battery system 1A according to an embodiment 2 of the invention.

FIG. 7 is a block diagram illustrating a configuration of a UPS-supporting storage battery system 1A according to an embodiment 2 of the invention. The power distribution board 200A in FIG. 7 differs from the power distribution board 200 of FIG. 1 in that the power distribution board 200A includes signal meters 206_1 and 206_2, not the power meters 204_1 and 204_2, respectively. The signal meter 206_1 measures the amplitude of the PLC signal generated when the controller 201_1 performs PLC communication with the controller 301_1 of the information device 300_1. Similarly, the signal meter 206_2 measures the amplitude of the PLC signal generated when the controller 201_2 performs PLC communication with the controller 301_2 of the information device 300_2. Each signal meter 206 and the corresponding PLC modem 203 can be integrated. Because other items in FIG. 7 are the same as those of FIG. 1, the same symbol is attached to the same member and the repeated explanation is omitted.

The amplitude of the PLC signal generated when PLC communication is performed decreases as the impedance of the load connected to the power supply path L (impedance of the electric devices 300 and 400) increases. Therefore, the impedance of all the electronic devices connected to the power supply path L is estimated by detecting the amplitude of the PLC signal. Power consumption of all the electric devices can be calculated from estimated impedance and the voltage of the power supply path L. The controller of the power storage device 100 acquires the electric capacity for UPS based on power consumption of all the electric devices acquired for each power supply path L.

It should be considered that the embodiment disclosed herein is only illustrative and not restrictive in all respects. The scope of the invention is indicated not by the above description but by the appended claims, and is intended to include any modification within the claims and in the meaning and range of the equivalents.

What is claimed is:

1. A storage battery system comprising:
a storage battery which is charged with power supplied from at least one of a commercial power system and an independent power source, and supplies the charged power to a plurality of electric devices or the commercial power system;
a remaining level detection device which detects a remaining level of the storage battery;
a power outage detection device which detects whether or not the commercial power system is in a power outage state; and
a control unit which switches, based on the detection result by the remaining level detection device and the power outage detection device, an operation state of the storage battery to charging or discharging, and switches connection destinations of the storage battery,
wherein, when the commercial power system is not in a power outage state, the control unit supplies power from the storage battery to the electric devices or the commercial power system only if the remaining level of the storage battery exceeds a reference value, and the reference value is defined based on the power required to be supplied to the electric devices while the commercial power system breaks down,
wherein each of the electric devices is classified into a specific device which needs to operate during at least an operation time set individually while the commercial power system breaks down, and a non-specific device which needs not to operate while the commercial power system breaks down, and the reference value is determined based on the power required to operate each of the specific devices included in the electric devices during the operation time, and
wherein each of the specific devices has memory unit which stores predetermined information including at least information of the operation time and information of its own power consumption, and the control unit acquires the predetermined information stored in each of the specific devices by communicating with each of the specific devices, and calculates the reference value based on the acquired predetermined information.

2. The storage battery system according to claim 1, wherein the electric devices receive power supply from the storage battery via a common power supply path, and the storage battery system further comprises a power meter which measures power consumption of all the electric devices when the commercial power system is not in a power outage state, and the control unit calculates the reference value based on a measurement result of the power meter and the predetermined information stored in each of the specific devices.

3. The storage battery system according to claim 1, wherein the electric devices receive power supply from the storage battery via a common power supply path, the control unit communicates with each of the specific devices via power line communication, the storage battery system further comprises a signal meter which measures an amplitude of a signal transmitted through the power supply path when power line communication is performed, the control unit estimates power consumption of all the electric devices based on a measurement result of the signal meter, and the control unit calculates the reference value based on estimated power consumption of all the electric devices and the predetermined information stored in each of the specific devices.

4. A storage battery system comprising:
a storage battery which is charged with power supplied from at least one of a commercial power system and an independent power source, and supplies the charged power to a plurality of electric devices or the commercial power system:
a remaining level detection device which detects a remaining level of the storage battery;
a power outage detection device which detects whether or not the commercial power system is in a power outage state; and
a control unit which switches, based on the detection result by the remaining level detection device and the power outage detection device, an operation state of the storage battery to charging or discharging, and switches connection destinations of the storage battery,
wherein, when the commercial power system is not in a power outage state, the control unit supplies power from the storage battery to the electric devices or the commercial power system only if the remaining level of the storage battery exceeds a reference value, and the reference value is defined based on the power required to be supplied to the electric devices while the commercial power system breaks down, wherein each of the electric devices is classified into a specific device which needs to operate during at least an operation time set individually while the commercial power system breaks down, and a non-specific device which needs not to operate while the commercial power system breaks down, and the reference value is determined based on the power required to operate each of the specific devices included in the electric devices during the operation time, and wherein the electric devices receive power supply from the storage battery via a common power supply path, the electric devices include n (n is an integer not less than 1) units of the specific devices, and $T1, T2, \ldots,$ and $Tn$ are time periods during which the n units of the specific devices are operated while the commercial power system breaks down, $W1, W2, \ldots,$ and $Wn$ are power required to operate the a units of the specific devices, Tmax is a maximum value of the operation time of the n units of the specific devices during power outage, and Q is power consumption of all the non-specific devices excluding the n units of the specific devices from the electric devices, the reference value corresponds to the power expressed by formula $(W1 \times T1 + W2 \times T2 + \ldots + Wn \times Tn + Q \times Tmax)$.

5. A storage battery system comprising:

a storage battery which is charged with power supplied from at least one of a commercial power system and an independent power source, and supplies the charged power to a plurality of electric devices or the commercial power system;

a remaining level detection device which detects a remaining level of the storage battery;

a power outage detection device which detects whether or not the commercial power system is in a power outage state; and a control unit which switches, based on the detection result by the remaining level detection device and the power outage detection device, an operation state of the storage battery to charging or discharging, and switches connection destinations of the storage battery, wherein, when the commercial power system is not in a power outage state, the control unit supplies power from the storage battery to the electric devices or the commercial power system only if the remaining level of the storage battery exceeds a reference value, and the reference value is defined based on the power required to be supplied to the electric devices while the commercial power system breaks down, wherein each of the electric devices is classified into a specific device which needs to operate during at least an operation time set individually while the commercial power system breaks down, and a non-specific device which needs not to operate while the commercial power system breaks down, and the reference value is determined based on the power required to operate each of the specific devices included in the electric devices during the operation time, and wherein the electric devices arc classified into a plurality of groups each including at least one of the specific devices, the electric devices receive power supply from the storage battery for each group via a power supply path common in each group, the control unit terminates power supply to each group sequentially, starting from a group for which a power supply time has elapsed while the commercial power system breaks down, and the power supply time is a maximum value of the operation time determined for each specific device in a group.

* * * * *